US011485207B2

(12) United States Patent
Mather et al.

(10) Patent No.: US 11,485,207 B2
(45) Date of Patent: Nov. 1, 2022

(54) VEHICLE CONVERTIBLE TOP SYSTEMS

(71) Applicants: Carl Mather, Lake Orion, MI (US); Dorinel Neag, Commerce Township, MI (US); Brice A Burkhardt, Auburn Hills, MI (US)

(72) Inventors: Carl Mather, Lake Orion, MI (US); Dorinel Neag, Commerce Township, MI (US); Brice A Burkhardt, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/324,728

(22) Filed: May 19, 2021

(65) Prior Publication Data

US 2021/0268882 A1    Sep. 2, 2021

Related U.S. Application Data

(63) Continuation of application No. 17/124,821, filed on Dec. 17, 2020.

(60) Provisional application No. 62/949,040, filed on Dec. 17, 2019.

(51) Int. Cl.
| | |
|---|---|
| *B60J 7/11* | (2006.01) |
| *B60J 1/08* | (2006.01) |
| *B60J 1/18* | (2006.01) |
| *B60J 7/10* | (2006.01) |
| *B60J 7/00* | (2006.01) |
| *B62D 33/04* | (2006.01) |

(52) U.S. Cl.
CPC .................. *B60J 7/11* (2013.01); *B60J 1/085* (2013.01); *B60J 1/183* (2013.01); *B60J 1/1823* (2013.01); *B60J 7/0076* (2013.01); *B60J 7/106* (2013.01); *B62D 33/04* (2013.01)

(58) Field of Classification Search
CPC ... B60J 7/106; B60J 7/141; B60J 7/102; B60J 7/11; B60J 7/1621; B62D 33/04; B62D 33/046
See application file for complete search history.

(56) References Cited

U.S. PATENT DOCUMENTS

| | | | | |
|---|---|---|---|---|
| 4,615,557 | A * | 10/1986 | Robinson | B60J 7/1621 296/100.07 |
| 5,015,028 | A | 5/1991 | Bonnett | |
| 6,890,014 | B1 * | 5/2005 | King | B60P 3/423 296/99.1 |
| 8,408,623 | B1 * | 4/2013 | McAuliff | B60J 1/085 296/210 |

(Continued)

FOREIGN PATENT DOCUMENTS

EP        1184218 A1    3/2002

*Primary Examiner* — Jason S Morrow
(74) *Attorney, Agent, or Firm* — Ralph E. Smith

(57) ABSTRACT

A vehicle includes a vehicle body with a truck bed at least partially defining a cargo area, a tonneau cover at least partially enclosing the cargo area, a vehicle interior with passenger seating, and a modular, multi-component hard top assembly. The hard top assembly is configured to selectively and removably couple interchangeably between (i) the vehicle body to provide an enclosed configuration at least partially enclosing the vehicle interior and (ii) the tonneau cover. The multi-component hard top assembly is detachable from the vehicle body to provide an open air configuration for the vehicle interior.

15 Claims, 7 Drawing Sheets

(56) References Cited

U.S. PATENT DOCUMENTS

| | | |
|---|---|---|
| 8,764,095 B2 | 7/2014 | Ritzinger et al. |
| 10,787,131 B2 * | 9/2020 | Marchlewski ............ B60R 9/04 |
| 2001/0050494 A1 * | 12/2001 | Rusu ..................... B60J 7/1621 |
| | | 296/100.07 |
| 2007/0164587 A1 * | 7/2007 | Brockhoff ................. B60J 7/11 |
| | | 296/218 |
| 2008/0231072 A1 | 9/2008 | Franco et al. |
| 2015/0028395 A1 | 1/2015 | Horkheimer et al. |
| 2019/0329638 A1 * | 10/2019 | Willard ..................... B60J 7/11 |

* cited by examiner

VEHICLE CONVERTIBLE TOP SYSTEMS

CROSS REFERENCE TO RELATED APPLICATIONS

This application is a continuation application of U.S. patent application Ser. No. 17/124,821, filed Dec. 17, 2020, which claims the benefit of U.S. Prov. App. No. 62/949,040, filed Dec. 17, 2019, the contents of which are incorporated herein by reference thereto.

FIELD

The present application relates generally to vehicle convertible top systems and, more particularly, to modular multi-component hard top systems for a vehicle.

BACKGROUND

It is known in the motor vehicle art to provide a convertible top, which may be folded back or removed from the vehicle. In one example, the convertible top is constructed of a rigid/hard material (e.g., referred to as a hard top). Such convertible tops provide the user with the benefit of open air driving while affording available protection in the event of adverse weather conditions. However, hard top systems typically must be removed as one or more large components, which can be very heavy, thus requiring multiple people or special equipment to completely remove those systems from the vehicle. Further, such hard top systems cannot be stored on the vehicle when removed. Therefore, while such convertible tops work well for their intended purpose, it is desirable to provide improvements in the relevant art.

SUMMARY

In accordance with one example aspect of the invention, a vehicle is provided. In one example implementation, the vehicle includes a vehicle body including a truck bed at least partially defining a cargo area, a tonneau cover at least partially enclosing the cargo area, a vehicle interior with passenger seating, and a modular, multi-component hard top assembly. The hard top assembly is configured to selectively and removably couple interchangeably between (i) the vehicle body to provide an enclosed configuration at least partially enclosing the vehicle interior and (ii) the tonneau cover. The multi-component hard top assembly is detachable from the vehicle body to provide an open air configuration for the vehicle interior.

In addition to the foregoing, the described vehicle may include one or more of the following features: wherein the tonneau cover is rotatably coupled to the vehicle body and movable between a closed position enclosing the cargo area, and an open position enabling access to the cargo area; a shuttle bracket assembly coupled to the vehicle body and configured to support and selectively lift a rear portion of the hard top assembly; wherein the shuttle bracket assembly includes a base support coupled to the vehicle body, and a roof panel support rotatably coupled to the base support by a linkage, wherein the shuttle bracket assembly is movable between a lowered stowed position, and a raised deployed position; wherein a rear passenger roof panel of the hard top assembly is slidably coupled to the roof panel support; and wherein a channel is defined in the rear passenger roof panel and configured to slidably receive the roof panel support therein.

In addition to the foregoing, the described vehicle may include one or more of the following features: wherein the tonneau cover includes at least one latch manipulator assembly configured to utilize an existing locking lever of a roof panel of the hard top assembly to secure the roof panel to the tonneau cover; wherein each latch manipulator assembly includes a lower puck operably coupled to an upper puck, wherein the upper puck is configured to receive the existing locking lever; and wherein rotation of the lower puck is configured to rotate the upper puck to thereby rotate the existing locking lever into and out of engagement with the tonneau cover.

In addition to the foregoing, the described vehicle may include one or more of the following features: wherein the hard top assembly includes a plurality of removable roof panels selectively coupleable to the vehicle body to create a substantially contiguous roof over the vehicle interior, wherein each removable roof panel of the plurality of removable roof panels is separately removable from the vehicle body to provide an open air configuration at that specific location of the hard top assembly while enabling a user to detach, remove, and transport a smaller portion of the hard top assembly without assistance or specialized equipment; and wherein the multi-component hard top assembly further comprises a pair of removable C-pillars each separately removable from the vehicle body to provide further open air configuration while enabling the user to detach, remove, and transport the C-pillars of the hard top assembly without assistance or specialized equipment.

In addition to the foregoing, the described vehicle may include one or more of the following features: wherein the plurality of removable roof panels includes a left front removable roof panel configured to removably and interchangeably couple to (i) the vehicle body in a location above a driver's side of front passenger seating, and (ii) the tonneau cover in a left forward location thereof, and a right front removable roof panel configured to removably couple to: (i) the vehicle body in a location above a front passenger side of the front passenger seating, and (ii) the tonneau in a right forward location thereof; wherein the plurality of removable roof panels includes a rear removable roof panel configured to removably and interchangeably couple to (i) the vehicle body in a location above rear passenger seating, and (ii) the tonneau cover in a rearward location thereof; wherein the multi-component hard top assembly further includes a removable rear window assembly rotatably coupled to the rear removable roof panel; and wherein the rear window assembly is configured to rotate upward into a nested position within the rear removable roof panel.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

According to the principles of the present application, systems and methods are described for vehicle convertible top systems. In the example embodiments, the convertible top systems include a modular, multi-piece hard top assembly that enables removal of one or more rigid hard top pieces above passengers to create a more open air experience, particularly for rear seat passengers. Such a design advantageously breaks the hard top assembly into more manageable pieces, thereby making the removal of the hard top much easier.

Additionally, once removed, portions of the hard top assembly can be stored on a tonneau cover for the truck bed. In this way, a single operator can remove the vehicle roof and secure the panels on the tonneau cover to provide a completely securable (e.g., lockable) truck bed storage once the tailgate is lifted and locked. The tonneau cover is configured to raise to allow access to the truck bed. In some examples, the vehicle includes a shuttling assembly to assist in removal of a portion of the hard top assembly, and the tonneau cover includes latch manipulator assemblies to facilitate coupling portions of the hard top assembly to the tonneau cover.

Figure 1:
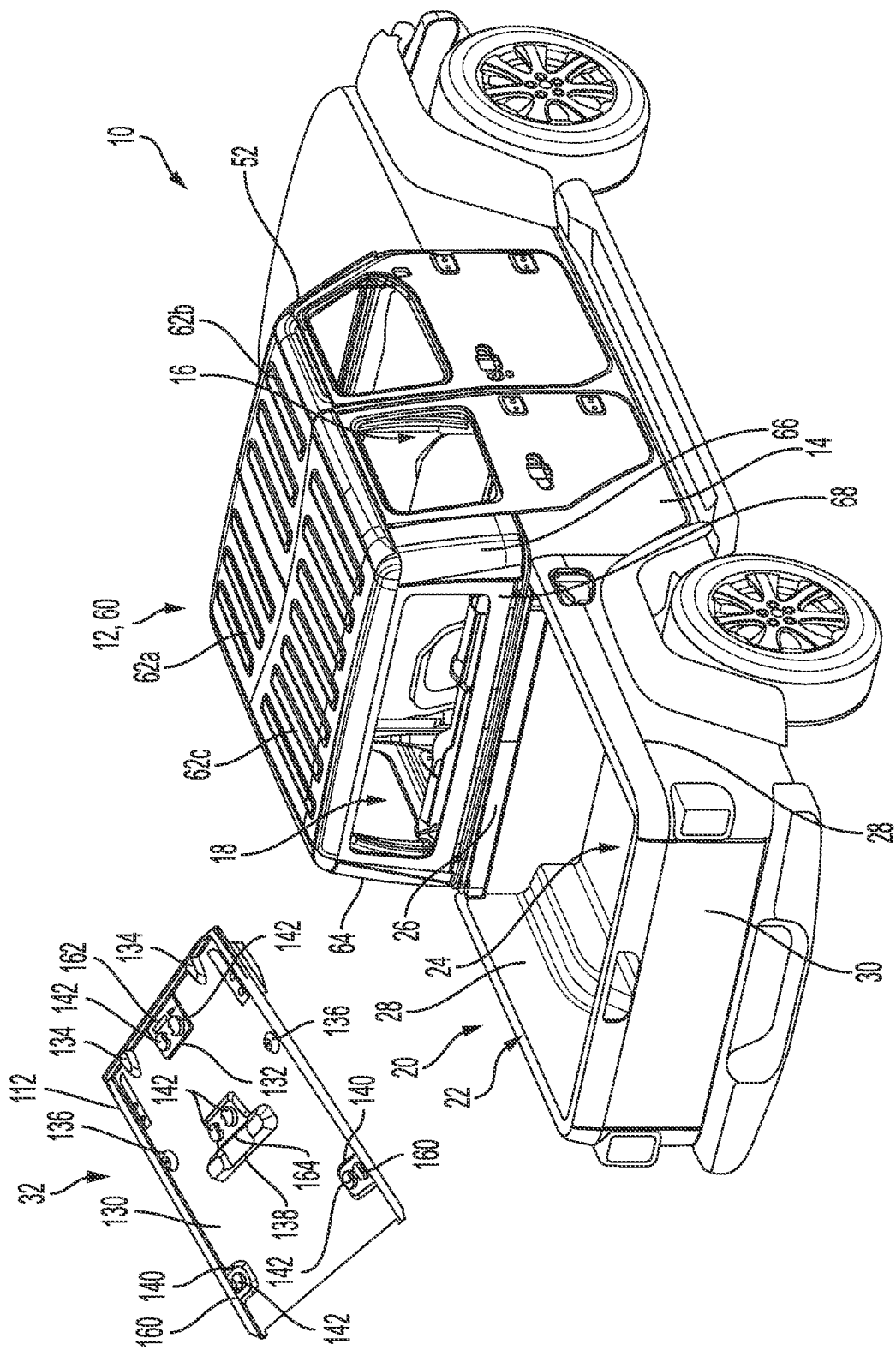
FIG. 1 is a rear perspective view of a vehicle with an example multi-component hard top assembly in accordance with the principles of the present disclosure.
Figure 2:
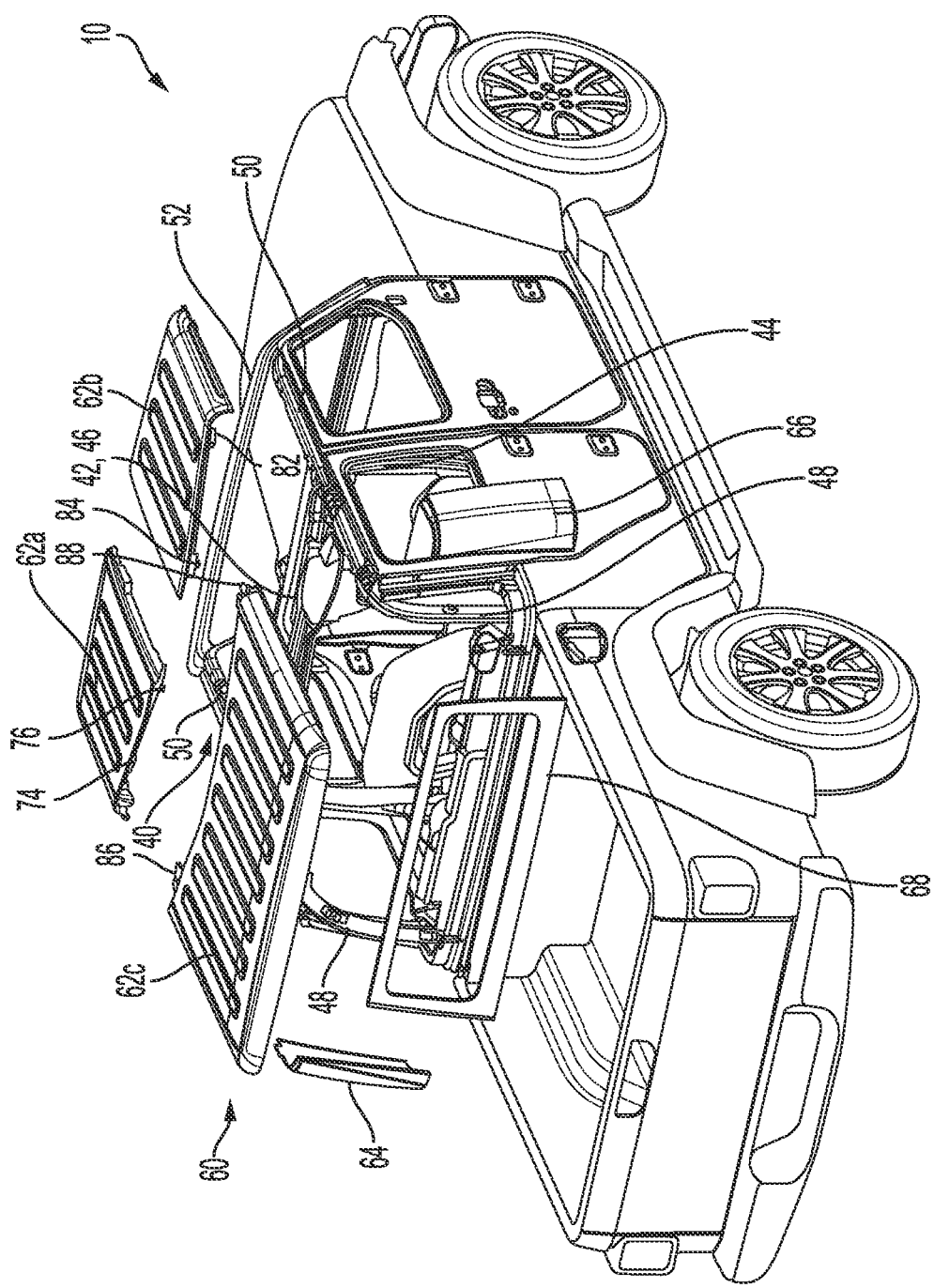
FIG. 2 is an exploded view of the example hard top assembly shown in FIG. 1, in accordance with the principles of the present disclosure.
Figure 6:
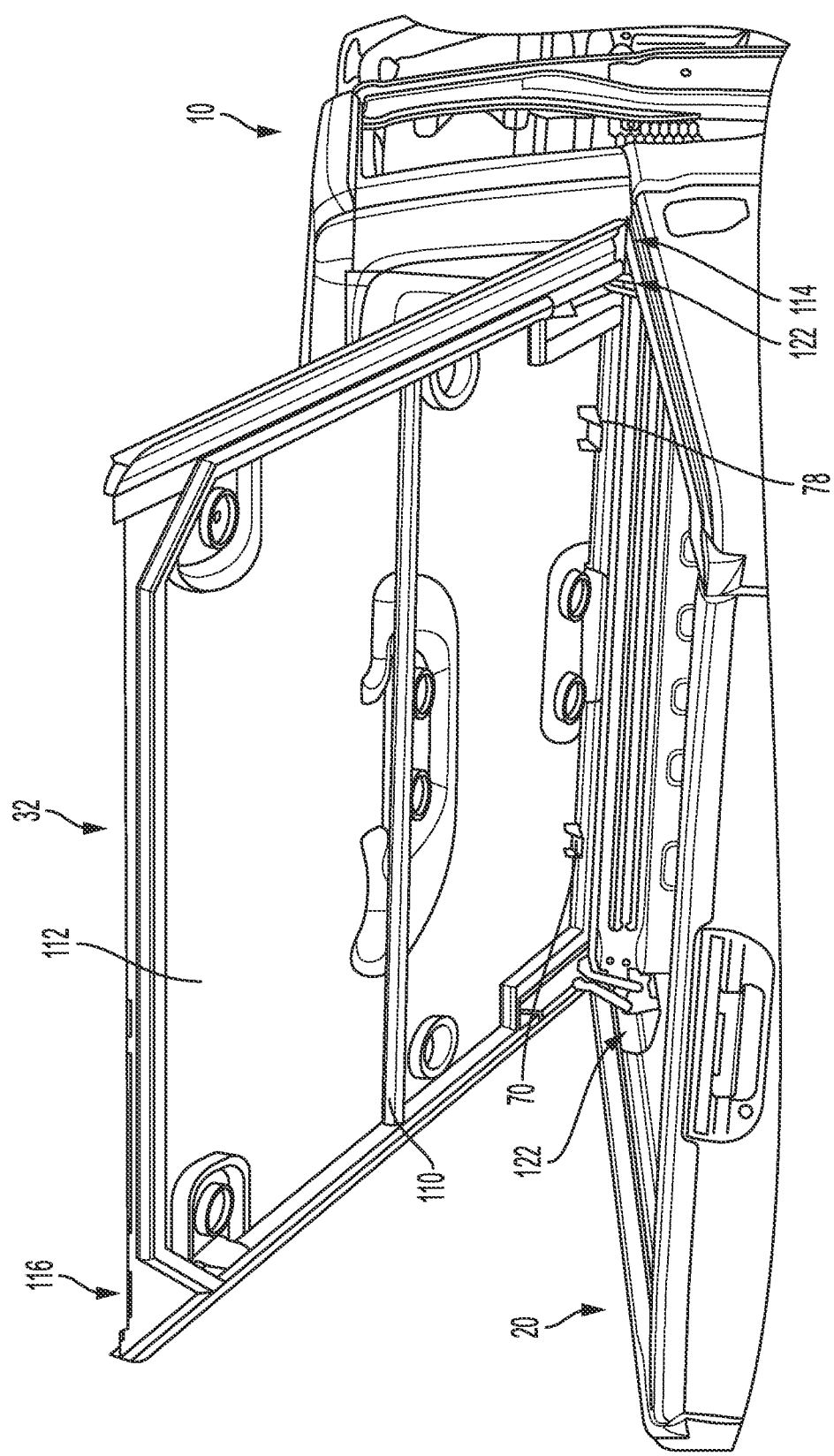
FIG. 6 is perspective view of the vehicle of FIG. 3 with the tonneau cover and hard top assembly in an open position, in accordance with the principles of the present disclosure.

With initial reference to FIGS. 1 and 2, a vehicle 10 having a convertible top system 12 in accordance with the principles of the present disclosure is illustrated. In the example embodiment, the vehicle 10 generally includes a vehicle body 14, an interior with front passenger seating 16 and rear passenger seating 18, and a storage or truck bed 20. In the example embodiment, vehicle 10 is a pickup truck, but it will be appreciated that the systems described herein may be utilized with various other types of vehicles. The truck bed 20 provides a cargo area 22 defined at least partially by a floor 24, a forward wall 26 (FIG. 6), side walls 28, and a tailgate 30, which is rotatably coupled to the vehicle body 14 and movable between an open position (not shown) and a closed position (shown). In the example implementation, a rigid tonneau cover 32 is rotatably coupled to the forward wall 26 and is movable between a closed position (FIG. 1) and an open position (FIG. 6). As described herein in more detail, the tonneau cover 32 is configured to receive and removably couple to portions of the convertible top system 12.

In the example embodiment, as shown in FIG. 2, a roll bar assembly 40 extends upwardly from the vehicle body 14 and includes a generally U-shaped main roll bar 42 formed by a pair of laterally spaced apart vertical members 44 interconnected by a transverse member 46. A pair of rear roll bars 48 are coupled to the main roll bar 42 and extend rearward therefrom and downwardly to the vehicle body 14. A pair of laterally spaced apart side bars 50 are coupled to the main roll bar 42 and extend forwardly to a vehicle windshield assembly 52.

With continued reference to FIG. 1, in the example embodiment, the convertible top system 12 is a multi-component hard top assembly 60 that generally includes a plurality of removable front passenger roof panels 62a-b, a removable rear passenger roof panel 62c, a pair of removable C-pillars 64, 66, and a removable rear window assembly 68. In some examples, the front passenger roof panels 62a-b are a single panel. As shown in FIG. 2, each of the front passenger roof panels 62a-b, rear passenger roof panel 62c, removable C-pillars 64, 66, and rear window assembly 68 are separately and removably secured to the roll bar assembly 40 and/or windshield assembly 52. In some examples, the rear window assembly 68 is rotatably coupled to the rear passenger roof panel 62c to enable the rear window assembly 68 to rotate upward and nest within a profile of the roof panel 62c.

In the example embodiment, the left front passenger roof panel 62a is removably coupled to the windshield assembly 52 by a locking latch 70 (FIG. 6) and a first rotatable locking lever 72 (e.g., see FIG. 8), and removably coupled to the rear passenger roof panel 62c by a second rotatable locking lever 74 and a third rotatable locking lever 76 (FIG. 2). Similarly, the right front passenger roof panel 62b is removably coupled to the windshield assembly 52 by a locking latch 78 (FIG. 6) and a first rotatable locking lever 80 (e.g., see FIG. 8), and removably coupled to the rear passenger roof panel 62c by a second rotatable locking lever 82 and a third rotatable locking lever 84 (FIG. 2). In general, the rotatable locking levers are configured to rotate (e.g., 90°) from a locked position that engages another component such that the panel is locked thereto, to an unlocked position where the locking lever does not engage the other component, thereby allowing separation of the panel from the other component. Locking latches may be a linkage configured to selectively engage and lock to another component, for example, the windshield assembly 52. However, it will be appreciated that locking levers and locking latches may have any suitable structure or configuration that enables hard top assembly 60 to function as described herein.

In the example embodiment, the rear passenger roof panel 62c is removably coupled to the roll bar assembly 40 on the left side by a first rotatable locking lever (not shown, similar to locking lever 72) and a first fastener flange 86 (FIG. 2), and on the right side by a second rotatable locking lever (not shown, similar to locking lever 72) and a second fastener flange 88 (FIG. 2). In the example embodiment, C-pillars 64, 66 are removably coupled the rear passenger roof panel 62c by quick release fasteners (not shown) but may alternatively or additional removably couple to the roll bar assembly 40, the vehicle body 14, and/or the rear window assembly 68. In the example embodiment, the rear window assembly 68 is rotatably coupled to the rear passenger roof panel 62c and, in some cases, removably coupled thereto. The rotatable coupling enables the rear window assembly 68 to fold upward and nest within the roof panel 62c where it is subsequently latched into place. When assembled, the hard top assembly 60 provides a sealed contiguous or substantially contiguous vehicle roof over the vehicle interior cabin.

Advantageously, in the example embodiment shown in FIG. 2, left front removable roof panel 62a is selectively uncoupleable from the hard top assembly 60 to provide an open air configuration over the driver's side of front passenger seating 16, and right front removable roof panel 62b is selectively uncoupleable from the hard top assembly 60 to provide an open air configuration over the front passenger's side of front passenger seating 16. Similarly, rear removable roof panel 62c is selectively uncoupleable from the hard top assembly 60 to provide an open air configuration over the entire rear passenger seating 18. To provide further open air configuration to the rear passenger seating 18, the removable C-pillars 64, 66 are selectively uncoupleable from the hard top assembly 60.

Figure 3:
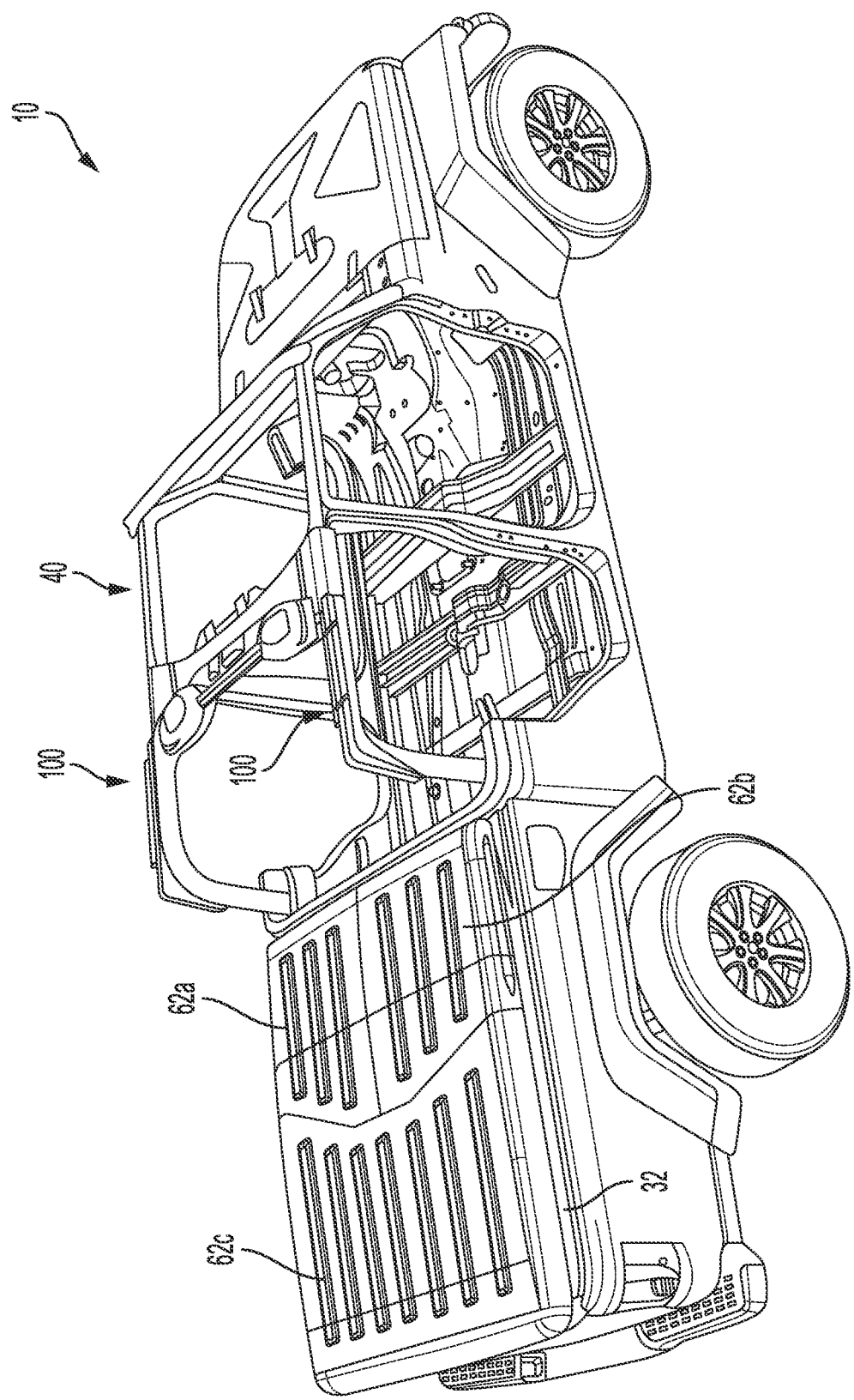
FIG. 3 is a rear perspective view of the vehicle of FIG. 1 with the hard top assembly assembled onto a tonneau cover of the vehicle, in accordance with the principles of the present disclosure.

FIG. 1 illustrates the vehicle 10 with the hard top assembly 60 assembled onto the vehicle body 14. If desired, a user can remove one or more portions of the hard top assembly 60 from the vehicle body 14. In this way, the hard top assembly 60 enables the ability to create an open air experience by removing the front passenger roof panels 62a-b, rear passenger roof panel 62c, C-pillars 64, 66, and rear window assembly 68, as shown in FIG. 3. Unlike a single piece assembly, the hard top assembly 60 includes multiple separately removable panels/windows/components that enable a single person to easily convert the vehicle 10 from an enclosed configuration (hard top assembly attached, FIG. 1) to an open-air configuration (hard top assembly, or portions thereof, removed) for example, as shown in FIG. 3.

With reference now to FIGS. 3-8, hard top assembly 60 is advantageously configured to be removed from the roll bar assembly 40 and subsequently stored on the tonneau cover 32 over the truck bed 20. In this way, a single operator can remove the vehicle hard top roof and secure the roof panels on top of the truck bed to provide a securable storage compartment. In some implementations, a rear portion of the hard top assembly 60 is supported by a shuttle bracket assembly 100, which is configured to support and lift the rear passenger roof panel 62c, C-pillars 64, 66, and rear window assembly 68 away from the vehicle during removal to enable easy access to quick release fasteners (not shown) for removal of the C-pillars 64, 66. The rear window assembly 68 is then foldable into the rear passenger roof panel 62c, which can then be removed from the shuttle bracket assembly 100 and coupled to the tonneau cover 32. As illustrated, the tonneau cover 32 provides a lockable truck bed storage cover movable between a closed position that encloses and secures the cargo area 22 (FIG. 3), and a lifted, open position that allows access to the cargo area 22 (FIG. 6).

Figure 4:
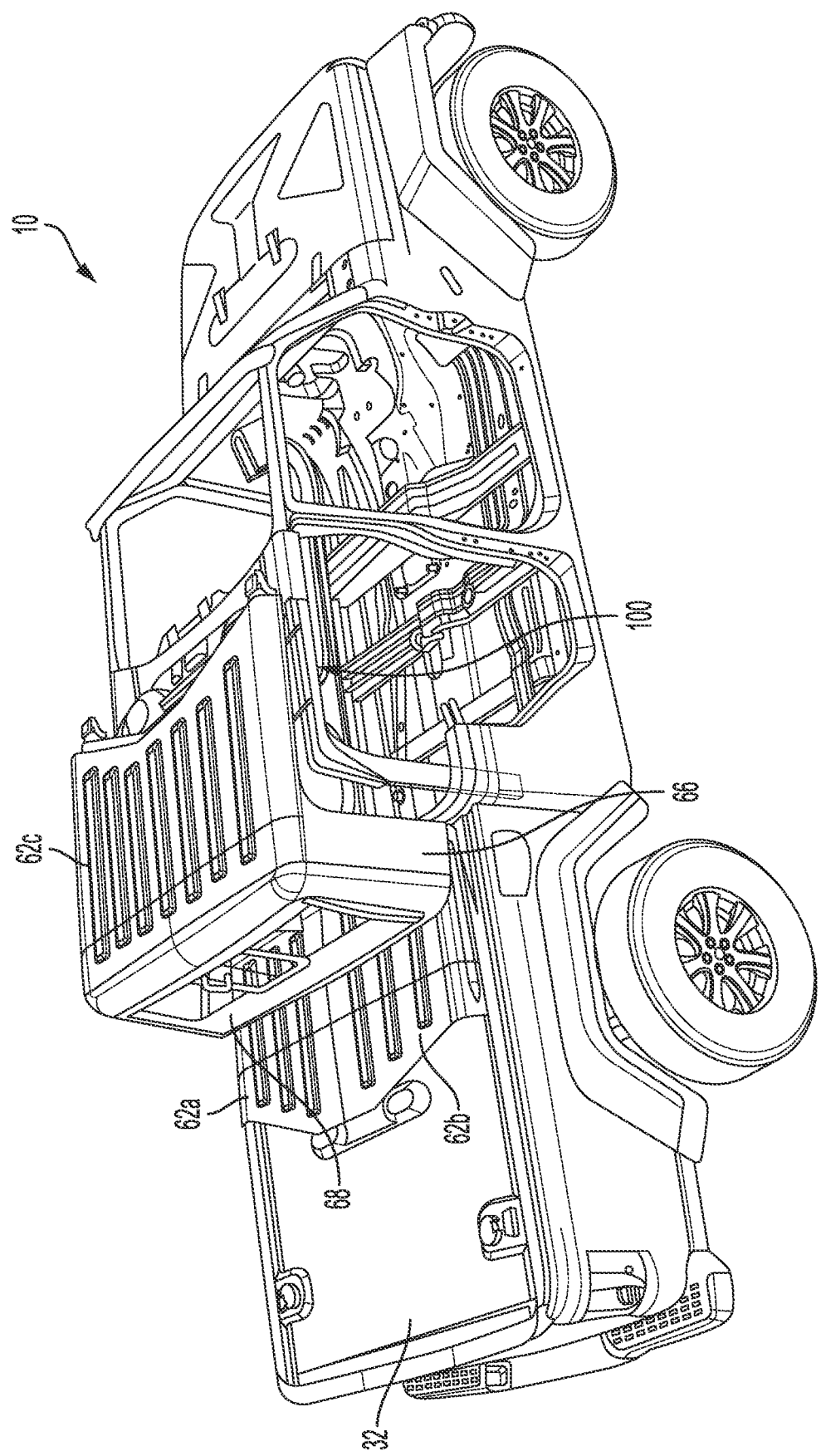
FIG. 4 is a perspective view of the vehicle of FIG. 1 with a rear portion of the hard top assembly in a removal position, in accordance with the principles of the present disclosure.
Figure 5:
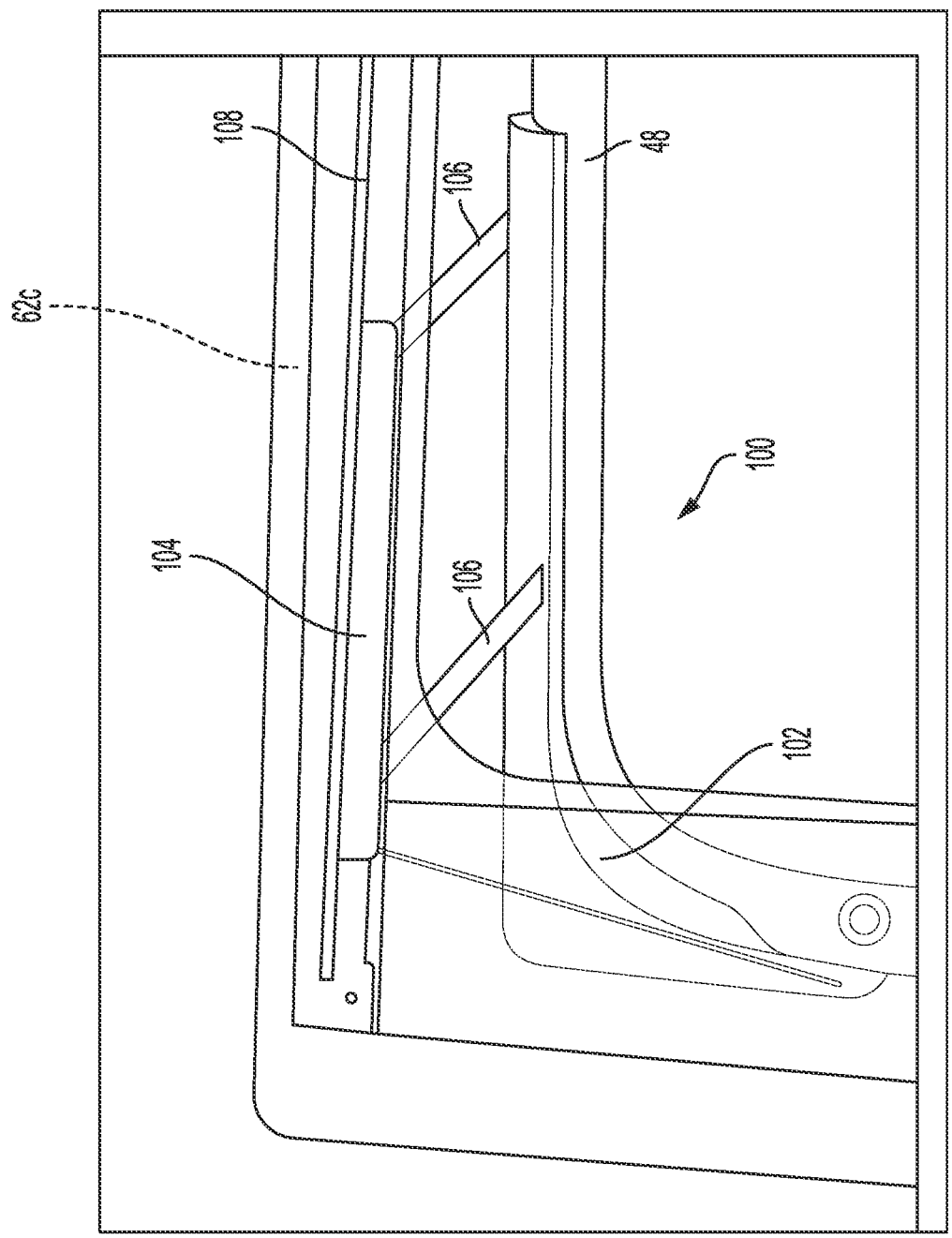
FIG. 5 is a side view of a shuttle bracket assembly for the rear portion of the hard top assembly (shown in transparent), in accordance with the principles of the present disclosure.

With continued reference to FIGS. 4 and 5, the shuttle bracket assembly 100 will be described in more detail. In the example embodiment, the vehicle 10 includes a pair of laterally spaced shuttle bracket assemblies 100, each generally including a base support 102, a roof panel support 104, and one or more linkage bars or members 106. As shown, the base support 102 is coupled to the rear roll bar 48, and the roof panel support 104 is rotatably coupled to the base support 102 by the one or more linkage members 106 (two shown). The roof panel support 104 is rotatable from a lowered, stowed position (FIG. 3) to a raised, deployed position (FIGS. 4 and 5). As shown in FIG. 5, an interior side of the rear passenger roof panel 62c includes a channel 108 configured to slidingly receive the roof panel support 104. In this way, the shuttle bracket assemblies 100 are configured to move to the deployed position to thereby raise the rear passenger roof panel 62 away from the roll bar assembly 40.

To remove the rear passenger roof panel 62c from the roll bar assembly 40, the shuttle bracket assemblies 100 are moved to the deployed position, which enables access to quick release fasteners (not shown) to uncouple the C-pillars 64, 66 for removal and storage. The rear window assembly 68 is then either uncoupled from the rear passenger roof panel 62c or rotated upward therein into a nested position and subsequently secured. The rear passenger roof panel 62c is then slid rearward until the roof panel supports 104 completely slide out of the channels 108 formed in the rear passenger roof panel interior surface. Once removed, the rear passenger roof panel 62c is stored or attached to the tonneau cover 32, and the shuttle bracket assemblies 100 are moved to the stowed position (FIG. 3).

Figure 7:
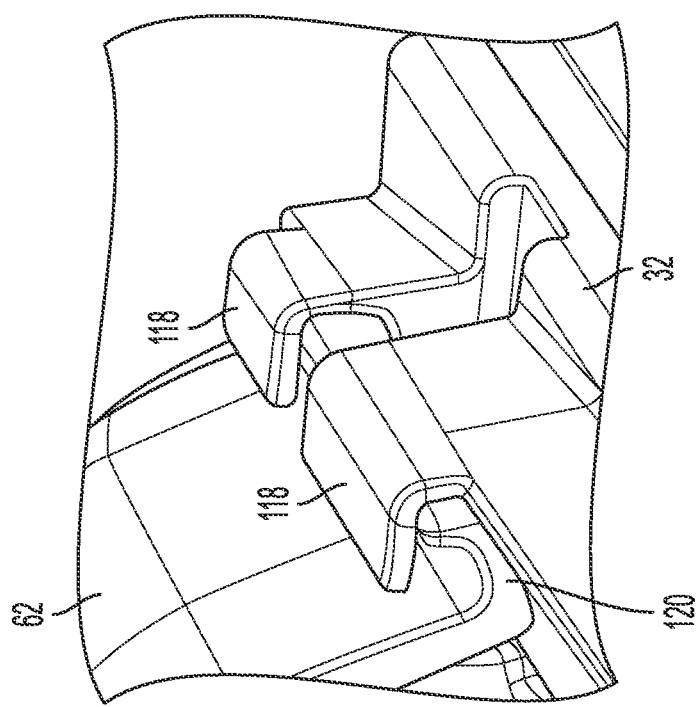
FIG. 7 is an enlarged view a portion of the hard top assembly assembled onto the tonneau cover, in accordance with the principles of the present disclosure.

With continued reference to FIGS. 1 and 6-8, attachment of the hard top assembly 60 to the tonneau cover 32 will be described in more detail. In the example embodiment, the tonneau cover 32 generally includes a frame 110 supporting a panel 112 extending between a forward end 114 and a rearward end 116 and configured to at least partially cover the truck bed 20. As shown in FIG. 7, the sides of panel 112 include an inwardly extending lip 118 configured to engage drip rails 120 on the perimeter edges of the roof panels 62a-c to facilitate securing the roof panels 62a-c to the tonneau cover 32. The frame 110 is rotatably coupled to the vehicle 10 by a pair of support brackets 122 (e.g., gas pistons) such that tonneau cover 32 is movable between the closed position (FIG. 1) and the open position (FIG. 6).

As shown in FIG. 1, in the example embodiment, the tonneau panel 112 includes an upper surface 130 defining a plurality of raised support/attachment surfaces including: a raised forward support 132, raised latch attachments 134, raised intermediate attachments 136, a raised intermediate support 138, and raised rear supports 140. In the example implementation, the raised forward support 132, raised intermediate support 138 and raised rear supports 140 each include one or more latch manipulator assembly 142.

Figure 8:
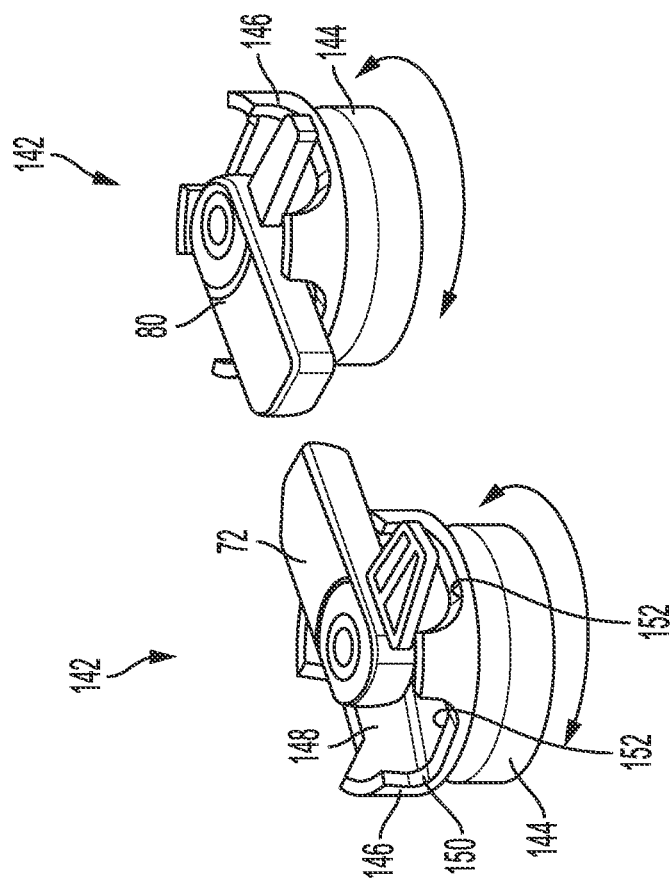
FIG. 8 is a perspective view of latch manipulator assemblies of the tonneau cover for attaching the hard top assembly thereto, in accordance with the principles of the present disclosure.

In the example embodiment, as shown in FIG. 8, each latch manipulator assembly 142 includes a lower puck 144 coupled to an upper puck 146. The lower puck 144 is disposed beneath the tonneau panel 112 and is accessible, for example, when the tonneau cover 32 is moved to the open position as shown in FIG. 6. The upper puck 146 is disposed above the tonneau panel 112 and is a generally cup-shaped member defining an interior cavity 148 at least partially defined by an annular sidewall 150. As shown in FIG. 8, the sidewall 150 includes notches or spaces 152 configured to receive portions of a rotatable locking lever (e.g., first rotatable locking lever 72). In this way, when a roof panel 62a-c is placed on the tonneau cover 32 such that the associated rotatable locking lever(s) are received within the upper puck 146, the lower puck 144 can be subsequently rotated by a user to thereby rotate the upper puck 146. This rotation causes edges of the sidewall 150 to catch the rotatable locking lever and rotate that locking lever into secured engagement with the tonneau cover 32.

With continued reference to FIGS. 1 and 3, one example hard top assembly 60 removal will be described. The operation begins by detaching front passenger roof panels 62a-b from the roll bar assembly 40, and raising the rear passenger roof panel 62c with the shuttle bracket assemblies 100. The C-pillars 64, 66 are then detached and removed, while the rear window assembly 68 is rotated upward into the nested position within rear passenger roof panel 62c and subsequently secured. The rear passenger roof panel 62c is then slid rearward off of the roof panel supports 104, which are then moved back into the stowed position.

The rear passenger roof panel 62c is then placed onto a rearward portion of the tonneau cover 32, as shown in FIG. 3, and fastener flanges 86, 88 are subsequently coupled (e.g., bolted) to the raised intermediate attachments 136. In this position, rotatable locking levers of the rear passenger roof panel 62 are received within latch manipulator assemblies 142 of the raised rear supports 140. The tonneau cover 32 is then raised, for example as shown in FIG. 6, and the lower pucks 144 are rotated to thereby rotate the rear roof panel rotatable locking levers into secured engagement with rear flanges 160 (FIG. 1) of the tonneau cover 32. In this way, the rear passenger roof panel 62c is secured to the tonneau cover 32 and supported by the raised intermediate attachments 136, a rearward portion of the raised intermediate support 138, and the raised rear supports 140.

The front passenger roof panel 62a is placed onto a forward driver side portion of the tonneau cover 32 with the drip rails 120 disposed beneath the inwardly extending lip 118, as shown in FIGS. 3 and 7, and the locking latch 70 is secured to one of the raised latch attachments 134. In this position, first rotatable locking lever 72 is received within a latch manipulator assembly 142 of the raised forward support 132, and third rotatable locking lever 76 is received within a latch manipulator assembly 142 of the raised intermediate support 138. The tonneau cover 32 is then raised, and the lower pucks 144 are rotated to thereby rotate the front roof panel rotatable locking levers 72, 76 into secured engagement with respective front and intermediate flanges 162, 164 of the tonneau cover 32 (see FIG. 1). In this way, the front passenger roof panel 62a is secured to the tonneau cover 32 and supported by the raised forward support 132, raised latch attachment 134, and raised intermediate support 138.

In a similar manner, the front passenger roof panel 62b is placed onto a forward passenger side portion of the tonneau cover 32 with the drip rails 120 disposed beneath the inwardly extending lip 118, as shown in FIGS. 3 and 7, and the locking latch 78 is secured to one of the raised latch attachments 134. In this position, first rotatable locking lever 80 is received within a latch manipulator assembly 142 of the raised forward support 132, and third rotatable locking lever 84 is received within a latch manipulator assembly 142 of the raised intermediate support 138. The tonneau cover 32 is then raised, and the lower pucks 144 are rotated to thereby rotate the front roof panel rotatable locking levers 80, 84 into secured engagement with respective front and intermediate flanges 162, 164 of the tonneau cover 32 (see FIG. 1). In this way, the front passenger roof panel 62b is secured to the tonneau cover 32 and supported by the raised forward support 132, raised latch attachment 134, and raised intermediate support 138. Accordingly, the hard top assembly 60 can be utilized as an overhead passenger roof and, if desired, may be stored on the vehicle tonneau cover 32.

Described herein are systems and methods for vehicles with modular, multi-component convertible hard top assemblies. The convertible hard top assembly includes a plurality of selectively removable panels, windows, and components to facilitate providing an open air vehicle configuration. This also enables a single operator to potentially remove the hard top components alone and advantageously store the hard top assembly components without assistance or specialized equipment. In some examples, a shuttle bracket assembly assists the user to lift the rear hard top assembly upward and away from the vehicle to improve and hasten removal. Additionally, portions of the hard top assembly may be installed on a rigid tonneau cover disposed over the truck bed, which provides a secured enclosure therefor. The tonneau cover can also include latch manipulator assemblies to enable existing roof panel locking levers to be utilized to removably secure the roof panels to the tonneau cover.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A vehicle comprising:
    a vehicle body including a truck bed at least partially defining a cargo area;
    a tonneau cover at least partially enclosing the cargo area;
    a vehicle interior with passenger seating; and
    a modular, multi-component hard top assembly configured to selectively and removably couple interchangeably between:
        (i) the vehicle body to provide an enclosed configuration at least partially enclosing the vehicle interior; and
        (ii) the tonneau cover,
    wherein the multi-component hard top assembly is detachable from the vehicle body to provide an open air configuration for the vehicle interior.

2. The vehicle of claim 1, wherein the tonneau cover is rotatably coupled to the vehicle body and movable between a closed position enclosing the cargo area, and an open position enabling access to the cargo area.

3. The vehicle of claim 1, further comprising a shuttle bracket assembly coupled to the vehicle body and configured to support and selectively lift a rear portion of the hard top assembly.

4. The vehicle of claim 3, wherein the shuttle bracket assembly includes:
    a base support coupled to the vehicle body; and
    a roof panel support rotatably coupled to the base support by a linkage,
    wherein the shuttle bracket assembly is movable between a lowered stowed position, and a raised deployed position.

5. The vehicle of claim 4, wherein a rear passenger roof panel of the hard top assembly is slidably coupled to the roof panel support.

6. The vehicle of claim 5, wherein a channel is defined in the rear passenger roof panel and configured to slidably receive the roof panel support therein.

7. The vehicle of claim 1, wherein the tonneau cover includes at least one latch manipulator assembly configured to utilize an existing locking lever of a roof panel of the hard top assembly to secure the roof panel to the tonneau cover.

8. The vehicle of claim 7, wherein each latch manipulator assembly includes a lower puck operably coupled to an upper puck, wherein the upper puck is configured to receive the existing locking lever.

9. The vehicle of claim 8, wherein rotation of the lower puck is configured to rotate the upper puck to thereby rotate the existing locking lever into and out of engagement with the tonneau cover.

10. The vehicle of claim 1, wherein the hard top assembly comprises:
a plurality of removable roof panels selectively coupleable to the vehicle body to create a substantially contiguous roof over the vehicle interior,
wherein each removable roof panel of the plurality of removable roof panels is separately removable from the vehicle body to provide an open air configuration at that specific location of the hard top assembly while enabling a user to detach, remove, and transport a smaller portion of the hard top assembly without assistance or specialized equipment.

11. The vehicle of claim 10, wherein the multi-component hard top assembly further comprises a pair of removable C-pillars each separately removable from the vehicle body to provide further open air configuration while enabling the user to detach, remove, and transport the C-pillars of the hard top assembly without assistance or specialized equipment.

12. The vehicle of claim 10, wherein the plurality of removable roof panels includes:
a left front removable roof panel configured to removably and interchangeably couple to (i) the vehicle body in a location above a driver's side of front passenger seating, and (ii) the tonneau cover in a left forward location thereof; and
a right front removable roof panel configured to removably couple to: (i) the vehicle body in a location above a front passenger side of the front passenger seating, and (ii) the tonneau in a right forward location thereof.

13. The vehicle of claim 10, wherein the plurality of removable roof panels includes a rear removable roof panel configured to removably and interchangeably couple to (i) the vehicle body in a location above rear passenger seating, and (ii) the tonneau cover in a rearward location thereof.

14. The vehicle of claim 13, wherein the multi-component hard top assembly further includes a removable rear window assembly rotatably coupled to the rear removable roof panel.

15. The vehicle of claim 14, wherein the rear window assembly is configured to rotate upward into a nested position within the rear removable roof panel.

* * * * *